United States Patent [19]

Martin et al.

[11] 3,720,842

[45] March 13, 1973

[54] TRANSPORTABLE REFRIGERATION UNIT HAVING INDUCTION ALTERNATOR-INDUCTION MOTOR RECONNECTION AND CONTROL SYSTEM

[75] Inventors: Robert L. Martin, Excelsior; Leland L. Howland, Rosemount; LeRoy J. Eichinger, St. Paul, all of Minn.

[73] Assignee: Thermo King Corporation, Minneapolis, Minn.

[22] Filed: Oct. 7, 1971

[21] Appl. No.: 187,434

[52] U.S. Cl..................................307/68, 62/236
[51] Int. Cl...................................H01f 1/00
[58] Field of Search..........307/68, 47, 64, 65, 66, 67; 62/236

[56] References Cited

UNITED STATES PATENTS 3,512,373    5/1970    White..................62/236 X

Primary Examiner—Herman J. Hohauser
Attorney—F. H. Henson et al.

[57] ABSTRACT

This invention relates to a transportable refrigeration unit having two modes of operation and more particularly to such a refrigeration unit having an induction machine that may function as a prime mover or as a generator of electric power after the proper connection to an appropriate receptacle has been made with a power cord which is connected to the induction machine and is adapted to be received by either a receptacle that is attached to the unit and has passive electrical components so connected thereto for converting the induction machine to an electric generator or to be received by an external electric power source receptacle without passive components connected thereto when the induction machine is to function as a prime mover.

5 Claims, 2 Drawing Figures

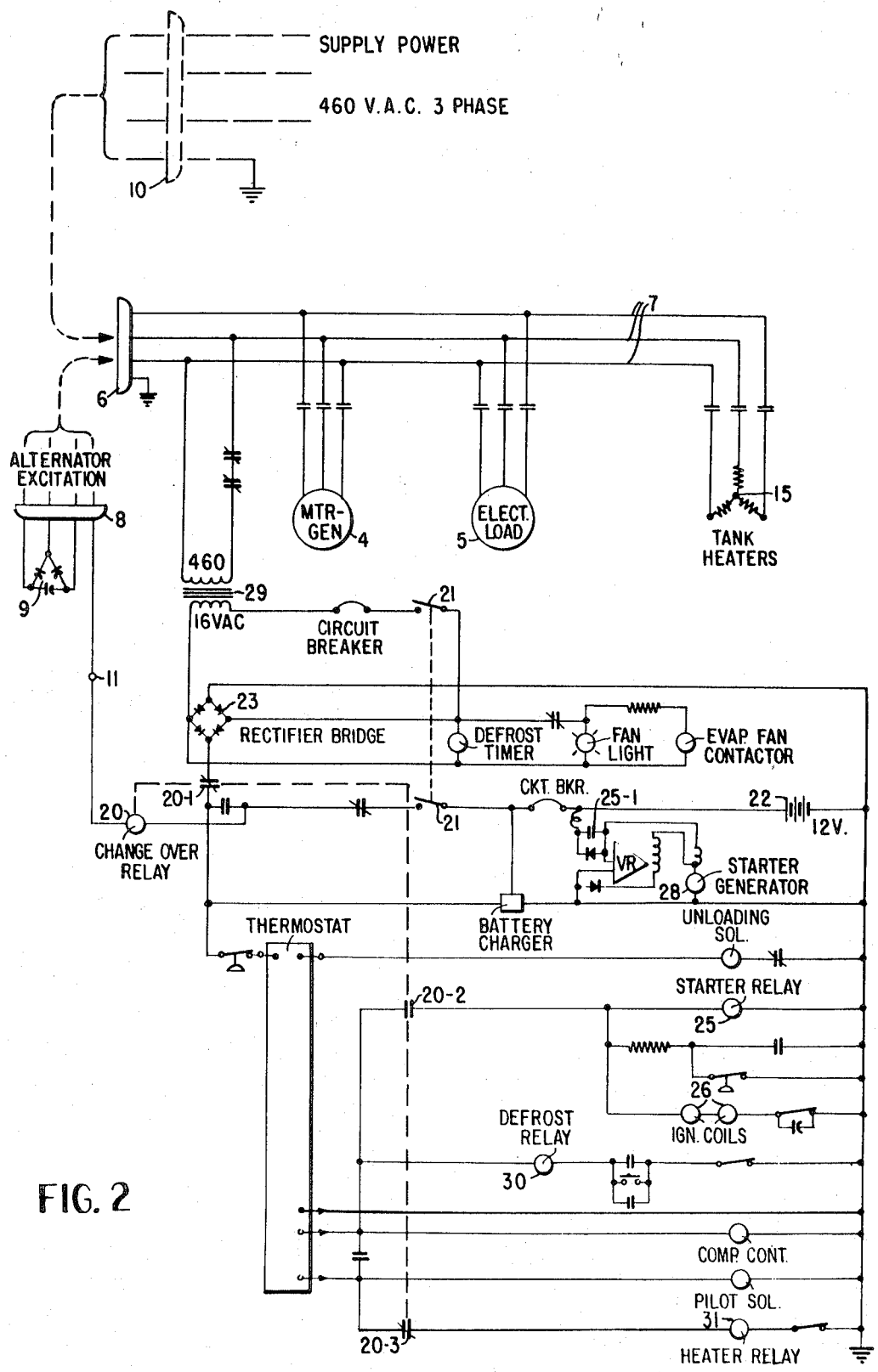

TRANSPORTABLE REFRIGERATION UNIT HAVING INDUCTION ALTERNATOR-INDUCTION MOTOR RECONNECTION AND CONTROL SYSTEM

CROSS REFERENCES TO RELATED APPLICATIONS

So far as known, this invention is not related to any pending patent application.

BACKGROUND OF THE INVENTION

It has been the custom in using transportable refrigeration units to provide a self contained prive mover or or other mechanical power source to drive both the compressor and the electric power generator of the unit. However, when the vehicle which provides the transportation is required to remain stationary for long periods of time, or when the units are containers on board a ship, or when refrigerated trailers are stationary at the loading dock, it is desirable to power the refrigeration units entirely from available external electric power without running the self contained prime mover such as an internal combustion engine or the like.

As stated above, it is therefore required that an alternate external source of electric power be available in order to continue the operation of the refrigeration unit and prevent the goods from spoiling. For systems of this type, a transportable refrigeration unit is provided which uses an induction machine both as a prime mover and alternatively as an engine driven auxiliary electric power generator when driven by the self contained prime mover. Such a system would be improved if it could eliminate the need for complicated switching arrangements which must be actuated whenever conditioning the unit to be operable from a self-contained source of prime mover power or from the alternate external electric power source. It would be most desirable to employ a conditioning means for a refrigeration unit which is simple but provides both reliable and safe electrical connections regardless of the skill of the user.

PRIOR ART

References may be made to the following United States patents which disclose a transportable refrigeration unit that may be powered either from an internal prime mover or from an external electric power source by converting an induction machine from a generator to an electric motor to drive the unit:

U.S. Pat. No. 2,907,182 — Kuklinski — issued Oct. 6, 1959

U.S. Pat. No. 3,043,115 — Harter — issued July 10, 1962.

However, neither of the above patents discloses a transportable refrigeration unit employing an induction machine functioning as a prime mover which may be converted into a generator of electric power depending primarily upon the connection of a power cord which is adapted to be received by either a receptable which is self contained within the portable unit having passive electrical components or by a receptacle which is an external source of electric power.

SUMMARY OF THE INVENTION

In order to provide an alternate source of power to drive a transportable refrigeration unit, the refrigeration unit is made capable of having two modes of operation. The unit is powered by a self contained prime mover in the first mode of operation and from the receptacle of an external power source during the second mode of operation. Mechanical means are provided to enable the prime mover to be connected to a compressor and to an induction machine functioning as a generator in the first mode of operation. The mechanical means also enable the prime mover to be disconnected from the compressor and induction machine during the second mode of operation. A power cord and plug, which is connected from the induction machine to the electrical loads during both first and second modes of operation, is adapted to be received during the first mode by a receptacle attached to the refrigeration unit and having passive electrical components. This enables the induction machine to function as a self excited generator of electric power for supplying power to the electric load during the first mode of operation. The plug is also adapted to be connected to the external power source receptacle to power both the electrical loads and the induction machine as a prime mover or motor in the second mode of operation. THis latter connection enables the induction' machine to function as a second prime mover to drive the compressor during the second mode of operation when the self contained prime mover is not in operation.

BRIEF DESCRIPTION OF DRAWINGS

FIG. 2 is a schematic circuit diagram illustrating the engine control and conditioning means of the transportable refrigeration unit.

DESCRIPTION OF PREFERRED EMBODIMENT

Figure 1:
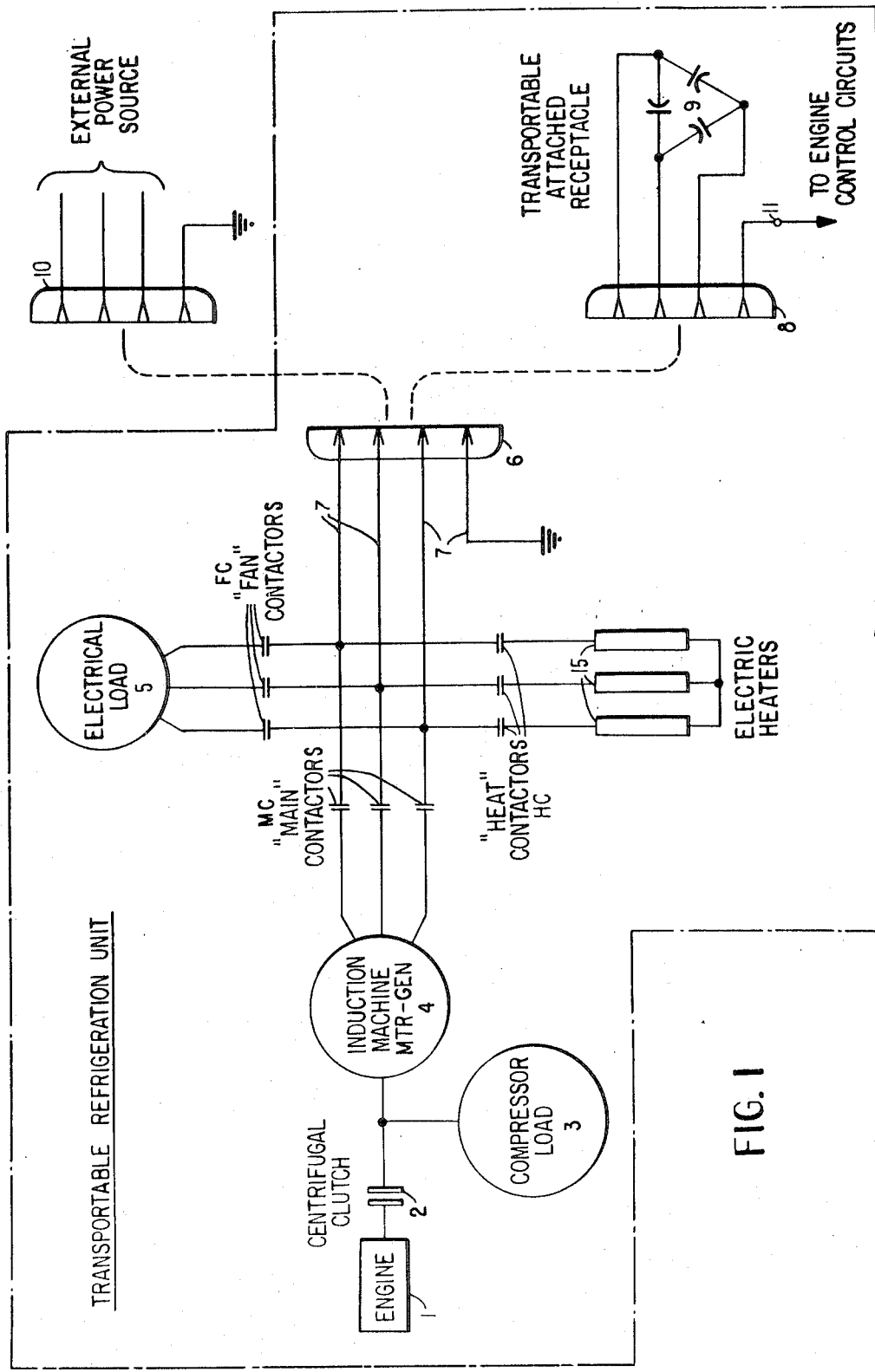
FIG. 1 is a block diagram of the overall transportable refrigeration unit and an external power source receptacle.

Referring to FIG. 1 of the drawings, a transportable refrigeration unit is shown which is capable of two modes of operation. The first mode of operation is to be utilized when a refrigerated cargo is being transported. In this first mode, a self contained prime mover such as an internal combustion engine 1 is connected to both a refrigerant compressor 3 and a main drive induction machine or motor-generator 4 by means of a centrifugal clutch 2, the purpose of engine 1 being to provide a power source to drive both compressor 3 and induction motor-generator 4. It is within the scope of this invention to employ a steam turbine or any other suitable prime mover in this place of internal combustion engine 1. In the preferred form of this invention, induction machine 4 is an alternating current, motor-generator, although any induction machine having both motor and generator capabilities may be employed. The induction motor-generator 4 is connected by means of a portable four conductor power cord or equivalent cable 7 and plug 6 to a receptacle 8 which is attached to the transportable unit and is adapted to receive the power plug 6. The attached receptacle 8 is provided with a bank of capacitors 9 or other suitable passive electrical components connected in delta configuration to three contact wire terminals of the attached receptacle 8. The capacitor bank 9 supplies sufficient excitation for the start up and functioning of motor-generator 4 as an engine driven, self excited induction generator, such as an alternator, during the first mode of operation. A fourth wire contact terminal 11 of the attached receptacle 8 may be connected to the engine control circuit to assure that only after the power plug 6 has been properly received by the attached receptacle 8 can engine 1 be conditioned to start, thus providing a built in safety feature when using the refrigeration unit in the first mode. Such engine control circuit and conditioning means will be more fully explained hereinafter.

As already disclosed, when power plug 6 is connected to receptacle 8 in the first mode of operation, the induction motor-generator 4 will function as a self excited generator of electric power which will then be capable of driving the electrical loads of the transportable refrigeration unit such as the fan motor 5 and the electric resistance defrost heaters 15. Means are provided for connecting the electrical loads 5 and 15 and the compressor 3 to the power cable 7 in both the first and second modes of operation. Heat contactors HC provide the means whereby the heaters 15 may be connected to the power cable in order to defrost the refrigeration units while the compressor 3 and fan motor 5 are not operating. Main contactors MC provide the means whereby compressor 3 may be periodically connected to power cable 7 during a cycling operation or where it becomes necessary to energize the fan motor 5 while the compressor is cycled on and off in order to regulate the amount of cold air flowing within the unit. Fan contactors FC provide the means whereby the fan motor 5 may be connected to the power cable 7 to drive a fan (not shown) in order to pass air through the evaporator coil (not shown) in heat exchange relationship with the refrigerant expanding from the compressor 3.

When the refrigerated container remains stationary for extended periods of time, where external electric power is available, it may become desirable to cease operating the self contained engine 1. In order to continue refrigerating the vehicle compartment, the external source of electric power must be arranged to power the compressor 3 and electrical loads 5 and 15 of the unit. The transportable refrigeration unit therefore will operate in the second mode of operation where it is to be powered by an alternate, external electric source. When engine 1 is shut down, it is mechanically disconnected from the compressor 3 and induction motor-generator 4 by means of centrifugal clutch 2 or other clutch device. The refrigeration unit may be simply and safely converted to operate from the alternate source of electric power during the second mode of operation by connecting power plug 6 to the external electric power receptacle 10. The external receptacle 10, which may be located at a loading dock, or on a pier, or on ship board, supplies 30,AC power to electric loads 5 and 15 by way of power cable 7. Electric power is also supplied to the induction motor-generator 4 which becomes conditioned to operate as a prime mover or, in the preferred case, as a motor during the second mode of operation. The induction motor 4 is now capable of driving the unit compressor 3 in the second mode of operation in order that refrigeration of the vehicle compartment may continue while the vehicle is at standstill and the self contained engine 1 is at rest.

FIG. 2 of the drawings shows the conditioning and control means for the internal combustion engine of the transportable refrigeration unit. During the first mode of operation when the unit is being driven by a self contained internal combustion engine, power plug 6 is connected to attached receptacle 8. Capacitor bank 9, connected to three contact wire terminals of power plug 8, provides sufficient excitation to enable induction motor-generator 4 to operate as an engine driven, self excited induction alternator to generate power for electrical loads 5 and 15. Change over relay 20 is electrically connected from the fourth wire 11 of plug 8 to the engine control circuitry. Change over relay 20 must be actuated in order to provide conditioning means for the internal combustion engine to start during the first mode of operation. The change over relay 20 incorporates a safety feature within the unit, whereas, without proper connection of power plug 6 to attached receptacle 8, change over relay 20 cannot be actuated thus preventing the engine starting circuit from becoming energized.

To commence operation of the self contained engine in the first mode of operation, on-off switch 21 is moved to the on position. Closing switch 21 enables 12 volt battery 22 to supply sufficient current over the circuit to ground through control wire 11 to actuate change over relay 20. With the actuation of change over relay 20, change over contact 20-1 will open to disconnect rectifier bridge 23 from the control circuit. It is desirable to energize rectifier bridge 23 only during the second mode of operation, when the transportable unit it powered from an external alternating current power source receptacle. Actuation of change over relay 20 also closes change over contact 20-2. The battery 22 is now connected to supply sufficient current to actuate starter relay 25 and ignition coils 26. Actuating starter relay 25 closes starter contact 25-1 and current is supplied to the windings of the starter-generator 28. The self contained internal combustion engine has thus been conditioned and begins to operate during the first mode of operation to drive the unit compressor and induction motor-generator 4.

As previously described, during the second mode of operation, it is desired not to operate the self contained internal combustion engine but alternatively to power the transportable refrigeration unit from an external source of electric power. During the second mode of operation, power plug 6 is connected to the receptacle 10 (shown dotted in FIG. 2) preferably of a 30, 46OV, external AC power source to supply power to electrical loads 5 and 15 and to induction motor-generator 4. The induction motor-generator 4 then functions as a prime mover, or, in the preferred embodiment as an induction motor which is capable of driving the units compressor during the second mode. Also, during the second mode of operation, power is supplied to rectifier bridge 23 from control power transformer 29, since in the second mode of operation, the change over relay 20 is not actuated and change over contacts 20-1 and 20-3 remain in a closed position. This enables rectifier bridge 23 to supply a direct current sufficient to energize defrost relay 30 and heater relay 31. Actuation of relays 30 and 31 is essential in order to defrost the refrigeration unit when heaters 15 will be energized while the units compressor and fan motor 5 are not operating.

Although other features of the engine control circuit and the refrigeration unit controls are illustrated, a detailed description of them is not considered necessary to the understanding of the instant invention and is therefore not made herein.

A transportable refrigeration unit has been disclosed which has two modes of operation, the unit operating in the first mode with a self contained internal source of power and in the second mode from an external AC power source. The unit is adapted to operate in either the first or second modes depending primarily upon making a simple electrical connection between a power cable and either an attached, self contained power source receptacle or an external, alternate power source receptacle. This connecting operation provides the unit with both a safe and convenient means whereby users of any skill can efficiently operate the unit in either the first or second mode of operation without actuating complicated or cumbersome switching arrangements.

What I claim as my invention:

1. A transportable refrigeration unit having two modes of operation to be powered by a first prime mover in the first mode of operation or from a receptacle of an electric power source to be connected to a second prime mover in the second mode of operation and comprising, a first prime mover, an induction machine operable as a generator in the first mode of operation and as a motor to be a second prime mover in the second mode of operation, a mechanical load connected to be driven with said induction machine, an electrical load, a power cord and plug, a receptacle having passive electrical components connected thereto and attached to the transportable unit, means to connect said first prime mover to said mechanical load and to said induction machine when functioning as a generator in the first mode of operation and to disconnect said first prime mover from the mechanical load and said induction maching when functioning as a second prime mover in the second mode of operation, means to connect said power cord to said induction machine and to said electrical load during the first and second modes of operation, said plug adapted to be received in said attached receptacle to connect said passive components to said induction machine to enable said induction machine to function as a generator of electric power for said electric load in the first mode of operation, said cord and plug being adapted to be connected to the external electric power receptacle in the second mode of operation to power said electrical load and said induction machine therefrom for causing said induction machine to function as a motor and the second prime mover.

2. The invention as defined in claim 1 having means to control the operation of said first prime mover, said attached receptacle having means connected to said control means whereby said first prime mover is able to be operable only when said plug is received in said attached receptacle.

3. The invention as defined in claim 2 having means to control the operation of said first prime mover, said attached receptacle providing electrical connections between said power cord and said prime mover control means for enabling said first prime mover to be operable during the first mode of operation.

4. The invention as defined in claim 1 wherein the means for connecting the first prime mover to said mechanical load and to said induction machine in the first mode of operation and for disconnecting said first prime mover in the second mode of operation is a centrifugal clutch.

5. The invention as defined in claim 1 wherein the passive electrical components connected to said attached receptacle are comprised of a bank of capacitors whereby said induction machine may function as a self excited induction generator during the first mode of operation.

* * * * *